US012416950B2

(12) United States Patent
Schiff et al.

(10) Patent No.: US 12,416,950 B2
(45) Date of Patent: Sep. 16, 2025

(54) MODULAR DISTRIBUTED CRYOGENIC SYSTEM

(71) Applicant: PsiQuantum, Corp., Palo Alto, CA (US)

(72) Inventors: David Schiff, Bozeman, MT (US); Gabriel Mendoza, San Francisco, CA (US); Faraz Najafi, Palo Alto, CA (US)

(73) Assignee: PSIQUANTUM, CORP., Palo Alto, CA (US)

( * ) Notice: Subject to any disclaimer, the term of this patent is extended or adjusted under 35 U.S.C. 154(b) by 0 days.

(21) Appl. No.: 18/864,314

(22) PCT Filed: May 12, 2023

(86) PCT No.: PCT/US2023/021995
§ 371 (c)(1),
(2) Date: Nov. 8, 2024

(87) PCT Pub. No.: WO2023/220345
PCT Pub. Date: Nov. 16, 2023

(65) Prior Publication Data
US 2025/0117055 A1    Apr. 10, 2025

Related U.S. Application Data

(60) Provisional application No. 63/364,567, filed on May 12, 2022.

(51) Int. Cl.
*G06F 1/20* (2006.01)
*G06N 10/40* (2022.01)
(52) U.S. Cl.
CPC .......... *G06F 1/20* (2013.01); *G06F 2200/201* (2013.01); *G06N 10/40* (2022.01)

(58) Field of Classification Search
None
See application file for complete search history.

(56) References Cited

U.S. PATENT DOCUMENTS 4,672,823 A * 6/1987 Benoit ................. F17C 3/085
                                              62/50.1
5,333,460 A    8/1994 Lewis et al.
(Continued)

FOREIGN PATENT DOCUMENTS

WO    WO2007084489 A2    7/2007
WO    WO2018039680 A1    3/2018
(Continued)

OTHER PUBLICATIONS

Holland, L. Vacuum Manual. Ed. by L. Holland. London, England: E. & F. N. Span Ltd, 1974. Web. (Year: 1974).*
Bluefors, "Introducing KIDE—The New Cryogenic Platform," https://bluefors.com/blog/introducing-kide-large-scale-cryogenic-platform/ viewed on Nov. 11, 2024.
Licausi, N. et al., "BTO Phase Shifter and Method of Fabrication Thereof," U.S. Appl. No. 18/845,679, filed Sep. 10, 2024.
(Continued)

*Primary Examiner* — Jenna M Maroney
(74) *Attorney, Agent, or Firm* — THE MARBURY LAW GROUP PLLC

(57) ABSTRACT

A modular distributed cryogenic distribution system, comprising: a common chamber housing cryogenic fluid conduits; and a plurality of cryochambers connected to the common chamber. A method of operating a modular distributed cryogenic distribution system comprising a common chamber housing cryogenic fluid conduits, and plural cryochambers connected to the common chamber, includes raising one the plurality of cryochambers room temperature while a second one of the plurality of cryochambers operates at a cryogenic temperature.

28 Claims, 8 Drawing Sheets

(56) References Cited

U.S. PATENT DOCUMENTS

| | | | |
|---|---|---|---|
| 9,816,750 B2 * | 11/2017 | Batey | F25D 29/001 |
| 11,480,299 B1 * | 10/2022 | Najafi-Yazdi | G06N 10/40 |
| 12,149,242 B1 * | 11/2024 | Gimeno-Segovia | G06N 10/40 |
| 2005/0229609 A1 * | 10/2005 | Kirichek | F25B 9/02 |
| | | | 62/51.1 |
| 2006/0185379 A1 | 8/2006 | Shapiro | |
| 2006/0187638 A1 | 8/2006 | Vinson et al. | |
| 2010/0305775 A1 | 12/2010 | Bean, Jr. et al. | |
| 2018/0160566 A1 | 6/2018 | Branton | |
| 2021/0072098 A1 * | 3/2021 | Tew, Jr. | G01K 1/08 |
| 2021/0216117 A1 | 7/2021 | Alissa et al. | |
| 2021/0278595 A1 | 9/2021 | Kumar | |
| 2021/0278738 A1 | 9/2021 | Kumar | |
| 2021/0350270 A1 | 11/2021 | Jones et al. | |

FOREIGN PATENT DOCUMENTS

| | | | | |
|---|---|---|---|---|
| WO | WO2020154745 A1 | | 7/2020 | |
| WO | WO-2023220345 A1 * | 11/2023 | | B01L 7/50 |
| WO | WO-2024118516 A1 * | 6/2024 | | |

OTHER PUBLICATIONS

ISR-WO—Notification of Transmittal of The International Search Report and Written Opinion of the International Searching Authority for International Patent Application No. PCT/US2023/021995, mailed Aug. 4, 2023, 8 pages.

IPRP-WO—Notification Concerning Transmittal of International Preliminary Report on Patentability and Written Opinion of the International Searching Authority for International Patent Application No. PCT/US2023/021995, mailed Nov. 21, 2024, 6 pages.

* cited by examiner

MODULAR DISTRIBUTED CRYOGENIC SYSTEM

RELATED APPLICATIONS

This application claims the benefit of priority to U.S. Provisional Application No. 63/364,567 filed on May 12, 2022, the entire contents of which are incorporated by reference herein.

TECHNICAL FIELD

Embodiments herein relate generally to cryogenic systems, such as cryogenic systems used for quantum computing (QC) applications, having a modular distributed architecture.

BACKGROUND

A cryostat is a device that is used to maintain cryogenic temperatures (e.g., 120° K or less) for objects or materials located within the cryostat. Cryostats have been used for a number of applications in which cryogenic temperatures are desirable and/or necessary. For example, many types of quantum computing (QC) systems require quantum processing operations to be performed at extremely low temperatures. A cryostat may be used to house components of the QC system used to perform quantum processing operations such that these components may be maintained within a specified cryogenic temperature range.

SUMMARY

According to one embodiment, a modular distributed cryogenic distribution system includes a common chamber housing cryogenic fluid conduits, and plural cryochambers connected to the common chamber.

According to another embodiment, a method of operating a modular distributed cryogenic distribution system comprising a common chamber housing cryogenic fluid conduits, and plural cryochambers connected to the common chamber, includes raising one the plurality of cryochambers room temperature while a second one of the plurality of cryochambers operates at a cryogenic temperature.

BRIEF DESCRIPTION OF THE DRAWINGS

For a better understanding of the various described embodiments, reference should be made to the Detailed Description below, in conjunction with the following drawings in which like reference numerals refer to corresponding parts throughout the Figures.

Figure 1:
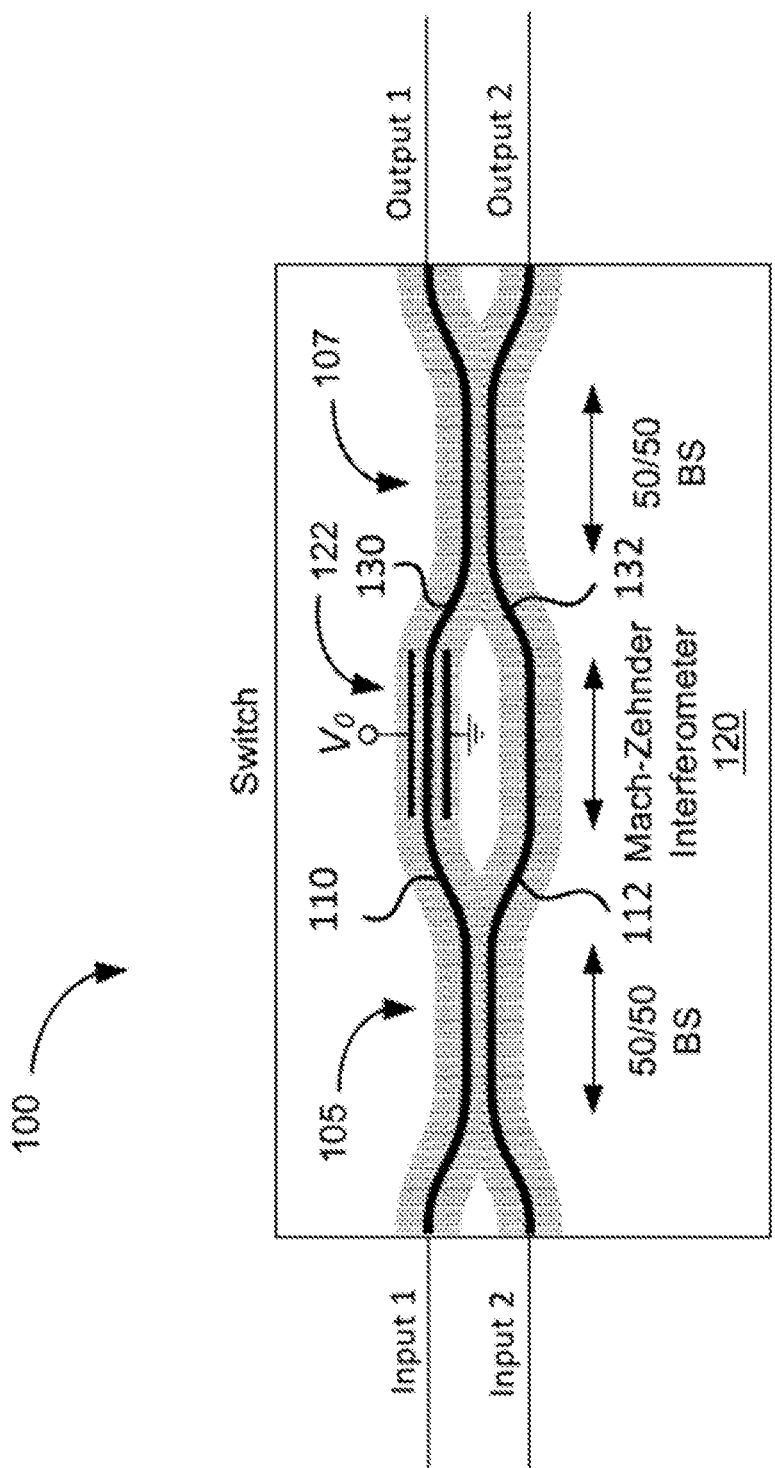
FIG. 1 is a simplified schematic diagram illustrating an optical switch, in accordance with some example embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Reference will now be made in detail to embodiments, examples of which are illustrated in the accompanying drawings. In the following detailed description, numerous specific details are set forth to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first electrode layer could be termed a second electrode layer, and, similarly, a second electrode layer could be termed a first electrode layer, without departing from the scope of the various described embodiments. The first electrode layer and the second electrode layer are both electrode layers, but they are not the same electrode layer.

The following description, for purpose of explanation, is described with reference to specific embodiments. However, the illustrative discussions that follow are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the particular uses contemplated.

FIG. 1 is a simplified schematic diagram illustrating an optical switch according to an embodiment of this disclosure. Referring to FIG. 1, switch 100 includes two inputs: Input 1 and Input 2 as well as two outputs: Output 1 and Output 2. As an example, the inputs and outputs of switch 100 can be implemented as optical waveguides operable to support single mode or multimode optical beams. As an example, switch 100 can be implemented as a Mach-Zehnder interferometer integrated with a set of 50/50 beam splitters 105 and 107, respectively. As illustrated in FIG. 1, Input 1 and Input 2 are optically coupled to a first 50/50 beam splitter 105, also referred to as a directional coupler, which receives light from the Input 1 or Input 2 and, through evanescent coupling in the 50/50 beam splitter, directs 50% of the input light from Input 1 into waveguide 110 and 50% of the input light from Input 1 into waveguide 112. Concurrently, first 50/50 beam splitter 105 directs 50% of the input light from Input 2 into waveguide 110 and 50% of the input light from Input 2 into waveguide 112. Considering only input light from Input 1, the input light is split evenly between waveguides 110 and 112.

Mach-Zehnder interferometer 120 includes phase adjustment section 122. Voltage $V_0$ can be applied across the waveguide in phase adjustment section 122 such that it can have an index of refraction in phase adjustment section 122 that is controllably varied. Because light in waveguides 110 and 112 still have a well-defined phase relationship (e.g., they may be in-phase, 180° out-of-phase, etc.) after propagation through the first 50/50 beam splitter 105, phase adjustment in phase adjustment section 122 can introduce a predetermined phase difference between the light propagating in waveguides 130 and 132. As will be evident to one of skill in the art, the phase relationship between the light propagating in waveguides 130 and 132 can result in output light being present at Output 1 (e.g., light beams are in-phase) or Output 2 (e.g., light beams are out of phase), thereby providing switch functionality as light is directed to Output 1 or Output 2 as a function of the voltage $V_0$ applied at the phase adjustments section 122. Although a single active arm is illustrated in FIG. 1, it will be appreciated that both arms of the Mach-Zehnder interferometer can include phase adjustment sections.

As illustrated in FIG. 1, electro-optic switch technologies, in comparison to all-optical switch technologies, utilize the application of the electrical bias (e.g., $V_0$ in FIG. 1) across the active region of the switch to produce optical variation. The electric field and/or current that results from application of this voltage bias results in changes in one or more optical properties of the active region, such as the index of refraction or absorbance.

Although a Mach-Zehnder interferometer implementation is illustrated in FIG. 1, embodiments of this disclosure are not limited to this particular switch architecture and other phase adjustment devices are included within the scope of this disclosure, including ring resonator designs, Mach-Zehnder modulators, generalized Mach-Zehnder modulators, and the like. One of ordinary skill in the art would recognize many variations, modifications, and alternatives.

Figure 2:
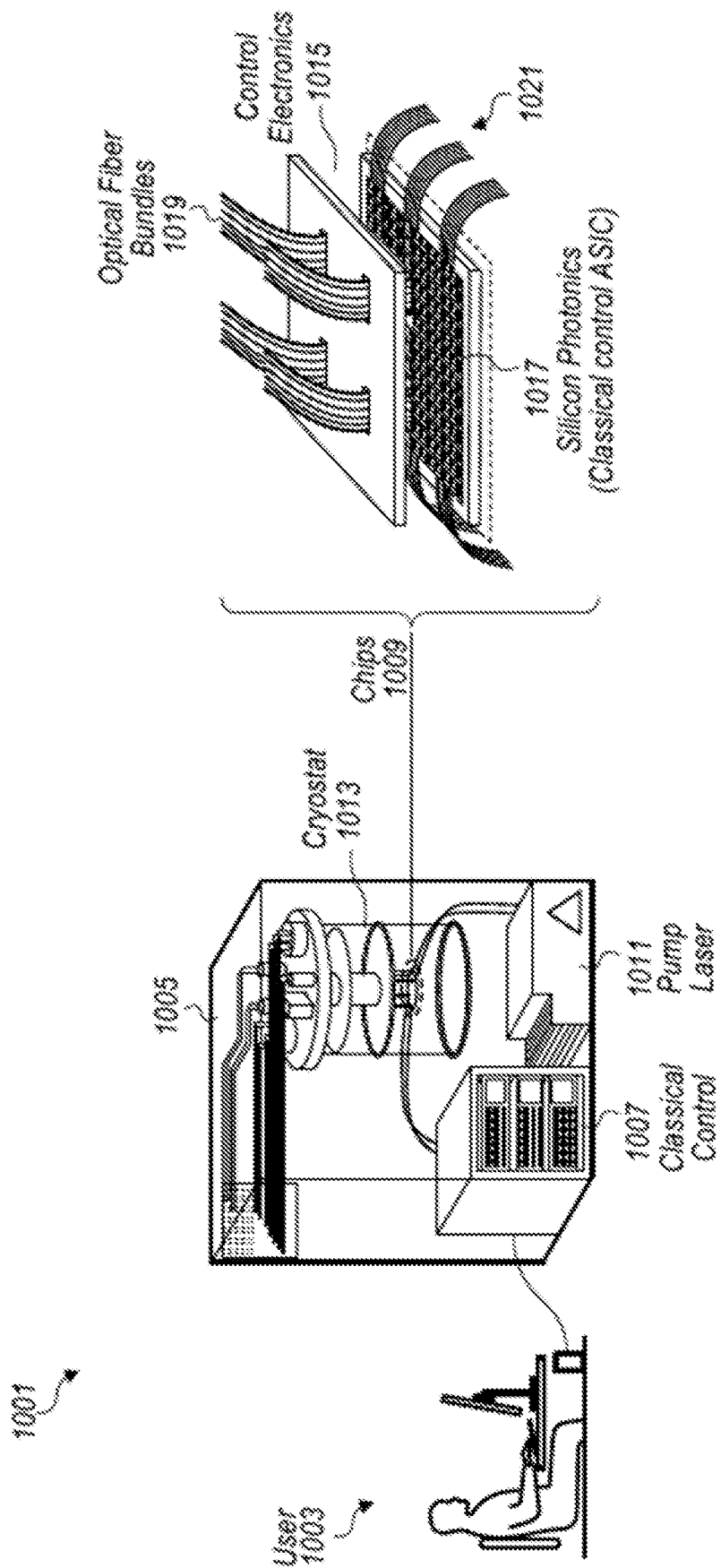
FIG. 2 is an illustration of a user interfacing with a hybrid quantum computing device, in accordance with some example embodiments.

In some embodiments, the optical phase shifter devices described herein may be utilized within a quantum computing system such as the hybrid quantum computing system shown in FIG. 2. Alternatively, these optical phase shifter devices may be used in other types of optical systems. For example, other computational, communication, and/or technological systems may utilize photonic phase shifters to direct optical signals (e.g., single photons or continuous wave (CW) optical signals) within a system or network, and phase shifter architectures described herein may be used within these systems, in various embodiments.

FIG. 2 is a simplified system diagram illustrating incorporation of an electro-optic switch with a prior art cryostat into a hybrid quantum computing system, according to some embodiments. In order to operate at low temperatures, for example liquid helium temperatures, embodiments of this disclosure integrate the electro-optic switches discussed herein (e.g., see FIG. 1) into a system that includes cooling systems. Thus, embodiments of this disclosure provide an optical phase shifter that may be used within a hybrid computing system of the type illustrated in FIG. 2. The hybrid computing system 1001 includes a user interface device 1003 that is communicatively coupled to a hybrid quantum computing (QC) sub-system 1005. The user interface device 1003 may be any type of user interface device, for example, a terminal including a display, keyboard, mouse, touchscreen and the like. In addition, the user interface device may itself be a computer such as a personal computer (PC), laptop, tablet computer, etc.

In some embodiments, the user interface device 1003 provides an interface with which a user can interact with the hybrid QC subsystem 1005. For example, the user interface device 1003 may run software, such as a text editor, an interactive development environment (IDE), command prompt, graphical user interface, and the like so that the user can program, or otherwise interact with, the QC subsystem to run one or more quantum algorithms. In other embodiments, the QC subsystem 1005 may be pre-programmed and the user interface device 1003 may simply be an interface where a user can initiate a quantum computation, monitor the progress, and receive results from the hybrid QC subsystem 1005. Hybrid QC subsystem 1005 may further include a classical computing system 1007 coupled to one or more quantum computing chips 1009 (e.g., cryogenic quantum information processing chips, cryogenic single photon detector PICs). In some examples, the classical computing system 1007 and the quantum computing chip 1009 (e.g., photonic integrated circuits (PICs), electrical integrated circuits (EICs) can be coupled to other electronic components, e.g., pulsed pump lasers 1011, microwave oscillators, power supplies, networking hardware, etc.

The quantum computing chips 1009 may be housed within a cryostat, for example, cryostat 1013. In some embodiments, each of the quantum computing chips 1009 can include one or more constituent chips, e.g., hybrid electronic chip 1015 and integrated photonics chip 1017. The photonics chip 1017 may include the switch 100 (FIG. 1) for quantum light state preparation and detectors to perform quantum measurements (e.g., superconducting nanowire single photon detectors). Signals can be routed on- and off-chip any number of ways, e.g., via optical interconnects (e.g., optical fiber bundles) 1019 and via other electronic interconnects 1021.

Prior art large scale cryogenic distribution systems, such as the ones shown in FIG. 2, do not allow for high numbers of separate payloads to be interfaced and cooled without the entire cryogenic system warming up or changing status. This limits the flexibility of having multiple different cryogenic chambers that can interface devices together due to the different life and service cycles of these devices within the system. Such prior art large scale systems do not have modularity built into the distribution scheme for the cryogenic routing and connections and thus cannot accommodate the increased number of individual payloads. Such cryogenic systems do not allow for the independent warming and cooling and access to individual cryogenic pods because they lack individual modules for payloads.

Figure 3:
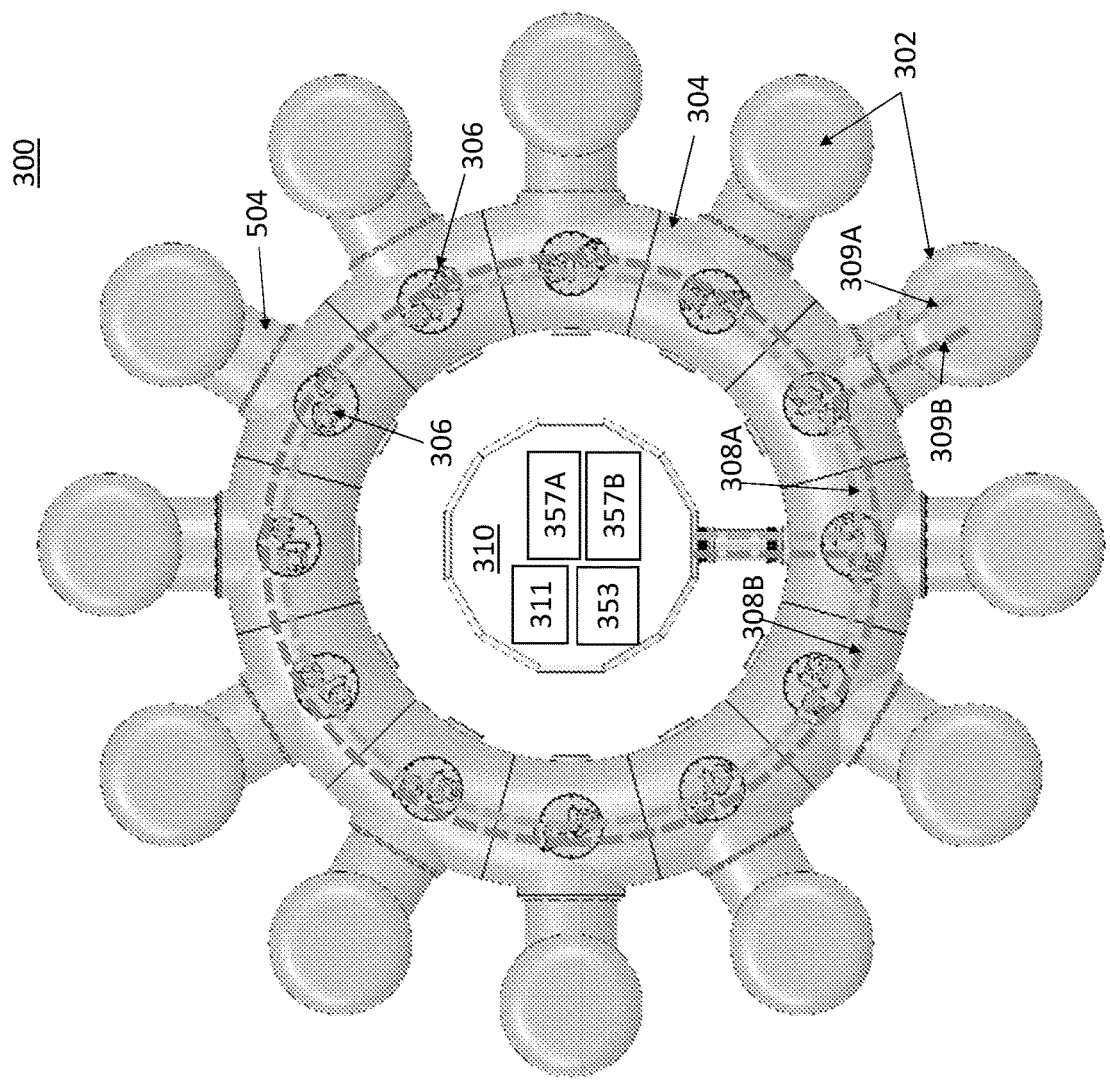
FIG. 3 is schematic a top view of a modular distributed cryogenic distribution system, in accordance with some example embodiments.

Referring to FIG. 3, a modular distributed cryogenic distribution system 300 of one embodiment (e.g., a cryogenic loop or ring system) breaks up the overall cryogenic distribution system into multiple separate cryochambers 302 (e.g., pods) attached to a common chamber 304 (e.g., loop enclosure, toroid, enclosed hoop) housing cryogenic fluid conduits 308A, 308B. The cryogenic fluid conduits 308A, 308B (e.g., pipes) are fluidly connected to the associated valves 306 and feedthrough conduits 309A, 309B into each cryochamber 302 for control. In one embodiment shown in FIG. 3, the common chamber 304 is an enclosure that is shaped as a toroidal loop. However, in other embodiments, the common chamber 304 may have other shapes (e.g., non-loop shapes), such as linear, curved, zig-zag, etc. The common chamber 304 can be maintained at a vacuum to provide a controlled environment to connect each of the cryochambers 302 to one another to implement distributed quantum computing tasks. In some example embodiments, the common chamber 304 comprises the coolant circulant system as well as optical interconnects (e.g., bundles of optical fiber) and electrical interconnects (e.g., cables) to connect the cryochambers through their respective interfaces to the common chamber 304. In some example embodiments, the optical interconnects in the common chamber transfer quantum light (e.g., photonic qubits, resource states, Greenberger-Horne-Zeilinger (GHZ) entangled states) between the chambers and the common chamber 304 provides a controlled environment that protects the optical interconnects from temperature changes and physical movement, which may otherwise disrupt or decohere the quantum light on the optical interconnects.

While two conduits 308A and 308B are shown in dashed lines as extending inside the common chamber 304 (e.g., toroidal loop enclosure), four or more conduits may be provided, as will be described below with respect to FIG. 6. For example, the conduits 308A and 308B may comprise liquid helium inlet and outlet conduits, respectively. If the modular distributed cryogenic distribution system 300 uses both liquid helium and nitrogen, the additional liquid nitrogen inlet and outlet conduits may be provided inside the common chamber 304 enclosure.

In one embodiment shown in FIG. 3, the common chamber 304 may have a circular shape (e.g., when viewed from the top). However, in other embodiments, the common chamber 304 may have a polygonal (e.g., triangular, rectangular, hexagonal, etc.), an oval or an irregular shape.

The embodiment shown in FIG. 3 includes a distribution scheme that is based upon a circular geometry with all the payloads (e.g., the above described chips 1009) in separate cryochambers (e.g., "pods") 302 arrayed around the outside of the common chamber 304. In other embodiments, the cryochambers 302 may be arrayed inside, above and/or below the common chamber 304 in addition to or instead of outside the common chamber 304. The center of the ring shaped loop contains a central hub 310 for connection into the larger distribution network 400 of individual modular systems (e.g., different instances of modular distributed cryogenic distribution system 300), as shown in FIG. 4.

Figure 4:
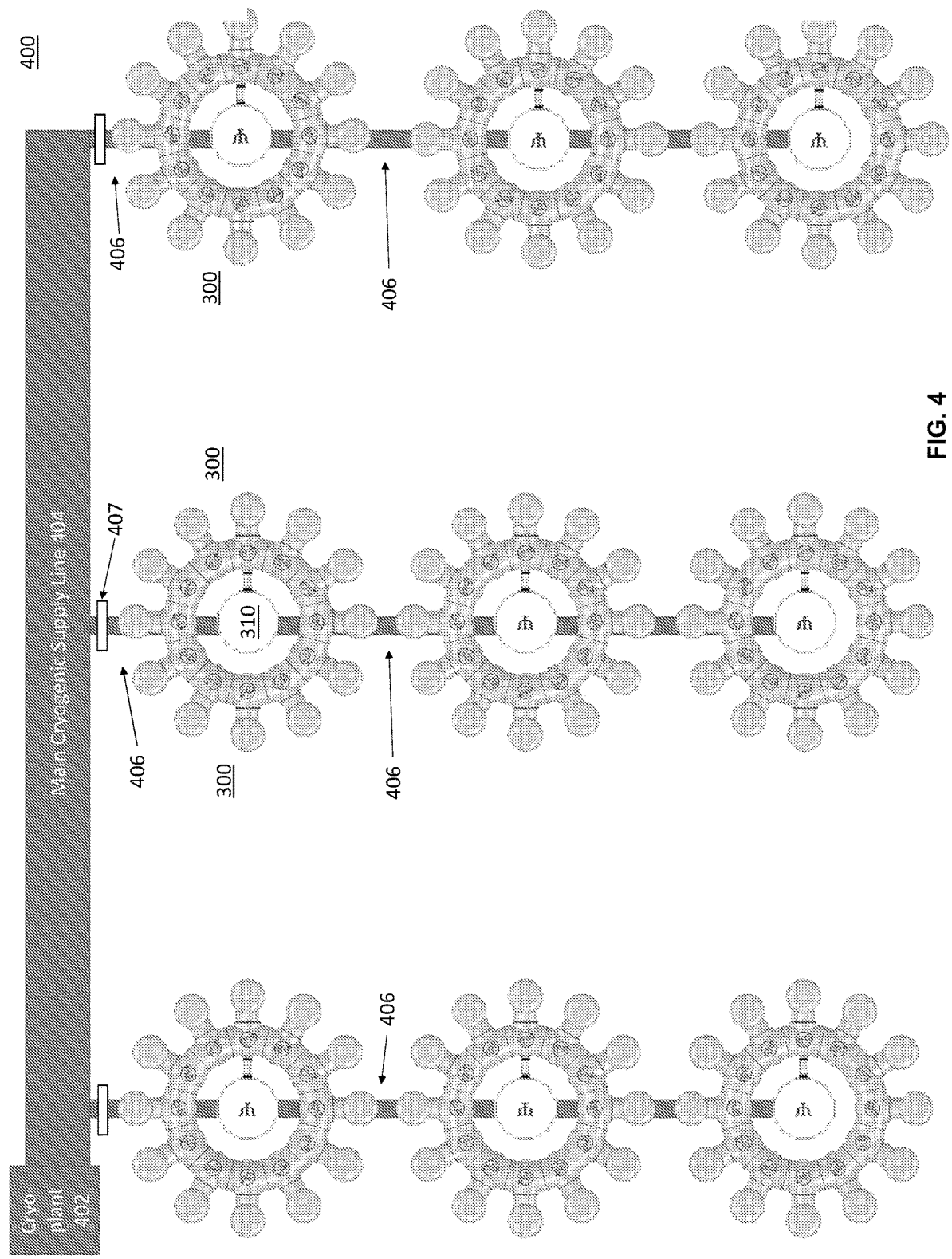
FIG. 4 is a schematic top view of a network of modular distributed cryogenic distribution systems, in accordance with some example embodiments.

As shown in FIG. 4, a main cryoplant 402 provides the cryofluid (e.g., liquid helium and/or nitrogen) into the main cryogenic supply line 404. The main cryoplant 402 may comprise any suitable cryoplant, such as a Stirling cryoplant, pulse tube cryoplant, etc. The cryofluid is distributed from the main cryogenic supply line 404 to branch supply lines 406. The branch lines 406 are fluidly connected to the hubs 310 of the respective modular distributed cryogenic distribution systems (e.g., the modular distributed cryogenic distribution system 300, FIG. 3). In some example embodiments, each branch line comprises a supply line valve 407 to fluidly isolate a set of cryogenic loops from the cryoplant 402. In some example embodiments, the hub 310 comprises a liquid helium coolant storage tank 357A and a liquid nitrogen coolant storage tank 357B for storage and circulation of the different cryogenic coolants. Further, the hub 310 may contain liquefiers (e.g., a condenser/cold head to recondense the cryofluid (e.g., helium)), a vacuum pump 353 which maintain the hub 310, the common chamber 304 and the pods at vacuum (e.g., at a pressure of about $10^{-6}$ torr), and valves. The central hub 310 is fluidly connected to the main cryogenic supply line 404 and functions as a buffer and control node for each modular distributed cryogenic distribution system. Thus, the hubs 310 provide control over the attached payloads for the given common chamber 304. In some example embodiments, each hub 310 comprises one or more hub valves 311 to fluidly isolate the hub 310 and therefor the modular distributed cryogenic distribution system 300 from the branch line 406 and cryoplant 402.

Referring back to FIG. 3, each common chamber 304 may be composed of several sections that combine to form the overall loop and provide an interface into the loop for the cryogenic connections and other input/outputs. Each common chamber 304 loop provides independent control over each attached payload in the respective cryochamber 302 using the valves 306. This allows for flexibility within the larger modular distributed cryogenic distribution system 300 to warm up and cool down each modular distributed cryogenic pod on its own timeline (e.g., without warming up or cooling other pods in the same loop).

The modular distributed cryogenic system 300 allows the integration of many pods into a large cryogenic supply of both liquid helium and nitrogen without the disruption of other cryochambers (e.g., cryochamber 302) or the liquefaction of the supply. In some prior art, large scale cryogenic systems, everything is located within one larger module, and everything is cooled down at the same time with very long cooldown times due the large mass within the module. This presents problems for cryogenic systems where cycle times and overall system reliability are important across a high number of cryogenic devices. Incorporating all the cryogenic devices into one substantial module and then pressing cooldown only to have component fail results in all payloads being taken off line.

In contrast, the modular distributed cryogenic distribution system 300 addresses this problem by providing an architecture that can scale up the modular distributed cryochambers (e.g., cryochamber 302) and/or independently service or take offline individual pods to meet the overall system size required instead of just waiting on one massive chamber.

Thus, each distributed cryogenic pod is just one section of a loop (e.g., ring) that can contain more pods as the radius of the common chamber 304 increases. Each pod is a section of the common chamber 304, and each common chamber 304 in connected to the large cryogenic supply lines through the hub 310. The pods have control valves 306 to turn off and on the flow of the cryofluid (e.g., liquid helium and nitrogen) into the cryochamber 302 from the common chamber 304.

Depending on the overall desired system size, each modular distributed cryogenic distribution system 300 may have a desired number of pods, and the number of modular distributed cryogenic distribution systems in the network 400 can be varied to meet the level of flexibility desired for cycle time and testing. During normal full system operation, all the valves 306 are open and the devices (e.g., the chips 1009) within the cryochambers (e.g., cryochamber 302) are interfaced to the cooling mechanism (e.g., the main cryoplant 402). When a fault is detected and a need arises to open one pod, the valves 306 for the specific pod close and heaters (described below) bring the cryochamber 302 (e.g., individual pod) to ambient conditions allowing for service access once vented (e.g., raised to atmospheric pressure) via pod vent 517 (e.g., to room temperature, ambient pressure of the room or environment), while the rest of the pods in the modular distributed cryogenic distribution system 300 continue to operate at cryogenic temperatures.

If a larger number of pods require service or changeover, the modular distributed cryogenic distribution system 300 can be closed off from the main cryogenic supply line 404 or the branch line 406 by closing valves in the respective modular distributed cryogenic distribution system 300 and hub. A similar heating and venting process can be applied to the modular distributed cryogenic distribution system 300, while the other systems in the network 400 continue to operate at cryogenic temperatures.

The modular distributed cryogenic system 300 and network 400 of systems 300 provide an improved level of control and access compared to prior art large-scale cryogenic systems. The modular distributed cryogenic distribution system 300 is suitable for the quantum computer described above to interface many devices (e.g., chips 1009) to a cryocooling source while maintaining a degree of flexibility for cycle time and accessibility.

The cryochambers (e.g., cryochamber 302) may contain their own set of valves 306, heaters (described below), and feedthroughs that connect into the common chamber 304 of the modular distributed cryogenic distribution system 300 through a respective bulkhead 504 (e.g., bulkhead interface to ta given pod). This allows each separate pod to go through an independent warm up and cool down cycle. Each pod may contain its own bulkhead 504 for the feedthroughs, as described below. In some example embodiments, each pod further comprises a rough pump valve 521 to couple to a vacuum pump (e.g., rough pump, manual pump) of the pod to place the pod in low or rough vacuum before the pod vacuum valve 510 (e.g., gate valve) is opened to the loop chamber. In this way, the ambient pressure in the cryochamber 302 (e.g., air from the environment in which the pod operates) is removed or mitigated and does not rush into the common chamber, and does not further rush into the other pods, which are vacuum coupled to the common chamber 304.

Figure 5B:
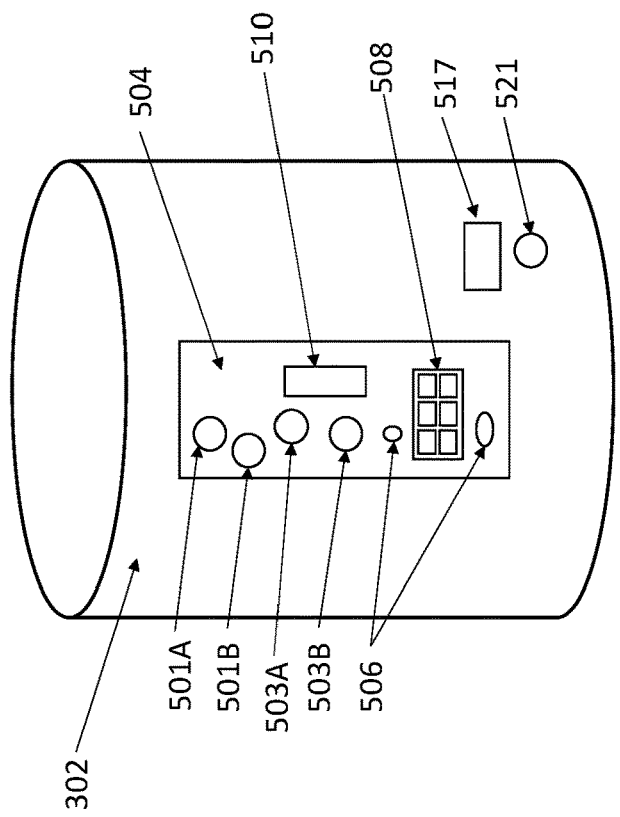
FIGS. 5A and 5B are rear and front perspective views, respectively, of one pod of the modular distributed cryogenic distribution system, in accordance with some example embodiments.
Figure 5A:
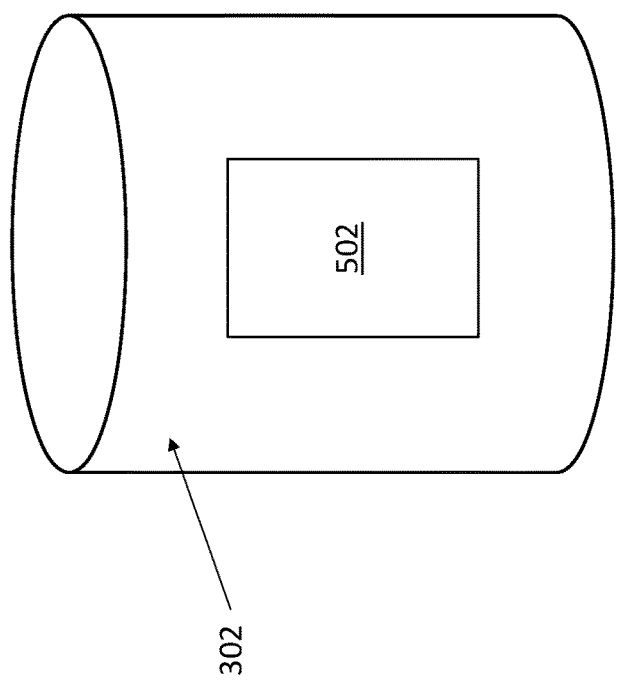

FIGS. 5A and 5B illustrate the rear and front views of one of the cryochambers, in accordance with some example embodiments. As shown in FIG. 5A, the back (rear) side of the cryochamber 302 which faces away from the common chamber (e.g., loop) 304 has an access door 502. The access door 502 may be opened by service personnel to service the components inside the cryochamber 302.

As shown in FIG. 5B, the front side of the cryochamber 302 which faces the common chamber 304 contains the bulkhead 504. The bulkhead 504 provides access from the common chamber 304 to the cryochamber 302. The bulkhead 504 may contain various feedthroughs (e.g., openings). In other embodiments, if the cryochamber 302 is located below the common chamber 304 instead of radially outwards of the common chamber 304, then the bulkhead 504 may be located on top of the cryochamber 302 instead of on the front side of the cryochamber 302.

Figure 6:
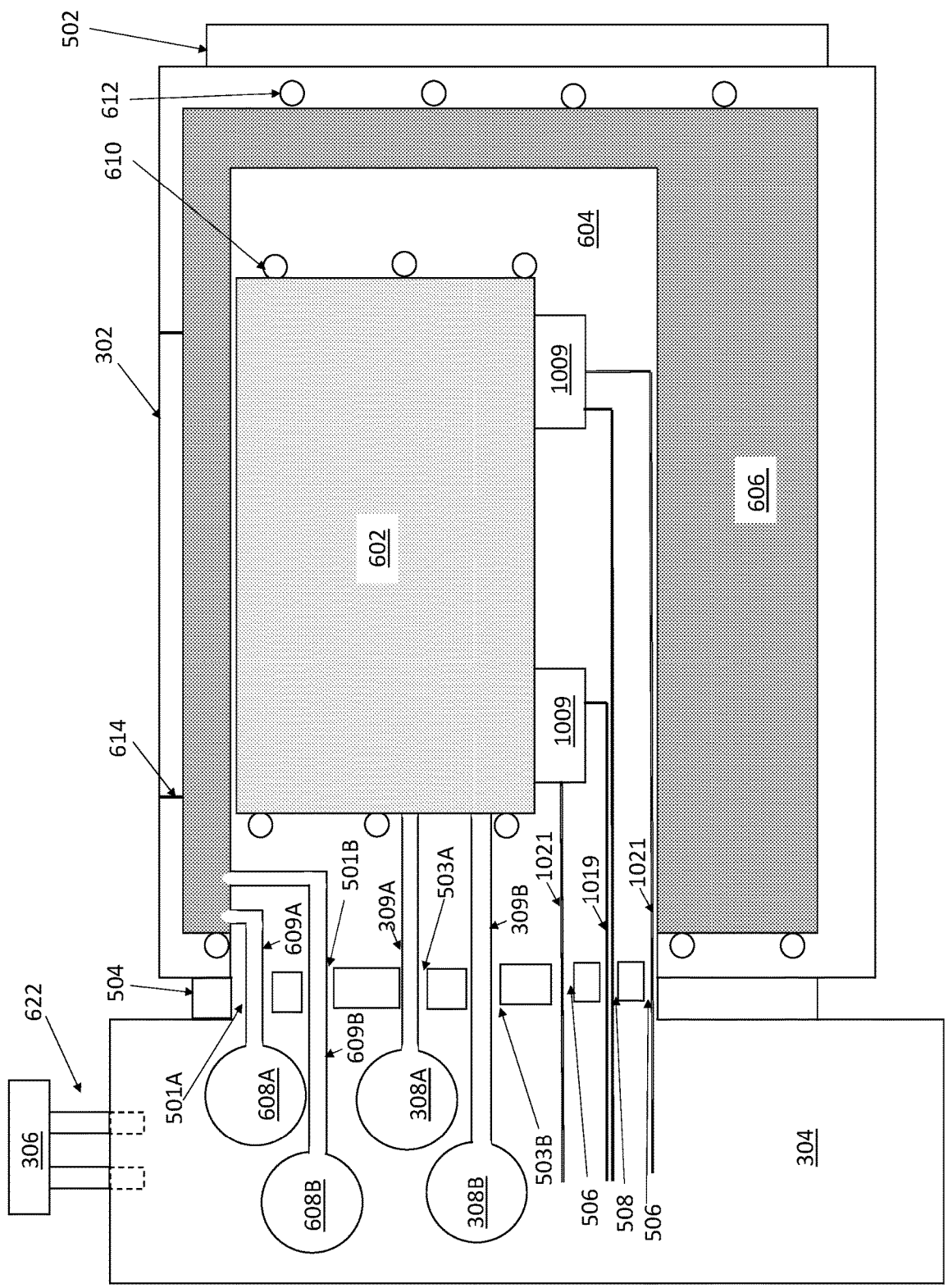
FIG. 6 is a side cross-sectional view of a cryochamber pod, in accordance with some example embodiments.

As shown in FIGS. 5B and 6, the common chamber 304 may comprise a vacuum chamber which houses liquid nitrogen inlet 608A and liquid nitrogen outlet 608B, respectively (e.g., cryogenic fluid conduits). Liquid nitrogen inlet 608A and liquid nitrogen outlet 608B have corresponding feedthrough conduits 609A and 609B (e.g., pipes that are sealed through the bulkhead) may extend through their respective bulkhead feedthroughs 501A and 501B of the bulkhead 504. The fluid feedthrough conduits 609A and 609B are fluidly connected through the bulkhead feedthroughs to the liquid nitrogen inlet 608A and liquid nitrogen outlet 608B, respectively, which are located inside the common chamber 304.

Liquid helium inlet and outlet fluid feedthrough conduits 309A and 309B may extend through their bulkhead respective feedthroughs bulkhead 503A and 503B in the bulkhead 504. The fluid feedthrough conduits 309A and 309B (e.g., pipes) are fluidly connected through the feedthroughs to the liquid helium inlet and outlet conduits 308A and 308B (e.g., looped pipes in the ringed common chamber), respectively, which are located inside the common chamber 304. The common chamber 304 can include the valves 306 to control circulation of the cryogenic coolants to the pods. In some example embodiments, the valves 306 comprise actuators or motors and arms 622 that extend down into the plenum to access and control valves to shut off or open respective cryogenic pipes (e.g., liquid nitrogen inlet 608A and liquid nitrogen outlet 608B, cryogenic fluid conduits 308A, 308B).

The bulkhead 504 further comprises a vacuum valve 510 that can open or close the cryochamber to the pressure system of the common chamber. For example, the vacuum valve 510 can be opened and the vacuum pump of the hub 310 can pump the common chamber and any cryochambers with open vacuum valves to put the common chamber and cryochambers in a low-pressure vacuum state.

In an optical bulkhead interface, optical interconnects (e.g., optical fiber bundles) 1019 extend from the common chamber 304 into the cryochamber 302 through optical feedthroughs 508 (e.g., optical ribbon cable couplers). In an electrical bulkhead interface, the electronic interconnects 1021 (e.g., direct current (DC) and/or radio frequency (RF) buses and/or wires) extend from the common chamber 304 into the cryochamber 302 through electrical feedthroughs 506. The interconnects may pass from the common chamber 304 into the central hub 310 and then out to the remaining quantum computer components described above. In the side view of FIG. 6, the vacuum valve (e.g., gate valve) between the cryochamber 302 and the common chamber 304 is not shown, however it is appreciated that the vacuum interface between the cryochamber 302 and the common chamber 304 can include a valve to fluidly isolate the chamber from the common chamber.

As shown in FIG. 6, the cryochamber 302 contains a liquid helium chamber 602, a vacuum plenum 604 and a liquid nitrogen chamber 606. The liquid helium chamber 602 contains liquid helium during operation of the modular distributed cryogenic distribution system 300. The liquid helium is cycled to the liquid helium chamber 602 through conduits 308A and 309A, and is cycled away from the liquid helium chamber 602 through conduits 308B and 309B. Thus, liquid helium is routed to and from the liquid helium chamber 602 via conduits 308A and 308B located in the common chamber 304 and through feedthrough conduits 309A and 309B which extend from the common chamber 304 into the cryochamber 302 through the bulkhead 504.

The liquid helium chamber 602 may be located in the vacuum plenum 604 of the cryochamber 302. The vacuum plenum 604 may be fluidly connected to the common chamber 304 via the feedthroughs in the bulkhead 504. Thus, when the common chamber 304 is pumped down to a vacuum (e.g., by a vacuum pump located in the hub 310), the vacuum plenum 604 is also pumped down to vacuum at the same time. The feedthrough conduits 309A and 309B may be fluidly connected to the liquid helium chamber 602 through the bulkhead 504 to cycle liquid helium to and from the chamber 602.

The quantum computing chips 1009 described above may be placed in thermal contact (such as direct or indirect physical contact) with the liquid helium chamber 602. For example, the quantum computing chips 1009 may be attached directly or via an interposer to the bottom of the liquid helium chamber 602. In other embodiments, the chips 1009 may be placed on different surface(s) of the liquid helium chamber 602, such that the liquid helium in chamber 602 cools the chips 1009 to a temperature of 4.2 K or below, such as 2-4K. Thus, the chips 1009 may be located in the vacuum plenum 604 below the liquid helium chamber 602.

The optical interconnects 1019 (e.g., optical fiber bundles) and the electronic interconnects 1021 are connected to the chips 1009 (e.g., from below and/or from the sides). The optical interconnects 1019 and the electronic interconnects 1021 extend through the vacuum plenum 604 to the respective feedthroughs in the bulkhead 504.

The liquid nitrogen chamber 606 may at least partially surround the vacuum plenum 604 and the liquid helium chamber 602. The liquid nitrogen chamber 606 provide a thermal shield to the liquid helium chamber 602. The fluid feedthrough conduits 609A and 609B cycle liquid nitrogen to and from the liquid nitrogen chamber 606. The liquid nitrogen chamber 606 may include a nitrogen shield and contain liquid nitrogen during operation, which is maintained at a temperature of about 77K.

A first heater 610 may be located adjacent to liquid helium chamber 602 to warm up the chamber 602 when the cryochamber 302 is being serviced or shut off. A second heater 612 may be located adjacent to liquid nitrogen chamber 606 to warm up the chamber 606 when the cryochamber 302 is being serviced or shut off. The heaters 610 and 612 may comprise independently controlled resistive heaters which are located at least one sidewalls of their respective chambers.

The liquid helium chamber 602, the vacuum plenum 604 and/or the liquid nitrogen chamber 606 may be attached to the cryochamber 302 using any suitable mechanical connections. For example, they may be suspended from the top of the cryochamber 302 using rods 614. Alternatively, they may be attached to the bottom and/or the side of the pod using one or more of rods, plates, brackets, etc.

Thus, the modular distributed cryogenic distribution system 300 of one embodiment, and the network 400 of such systems 300 described above, may be used in a quantum computing device described above. The modular distributed cryogenic distribution system 300 contains separate cryopods housing photonic and electronic chips 1009 of the quantum computing device.

Figure 7A:
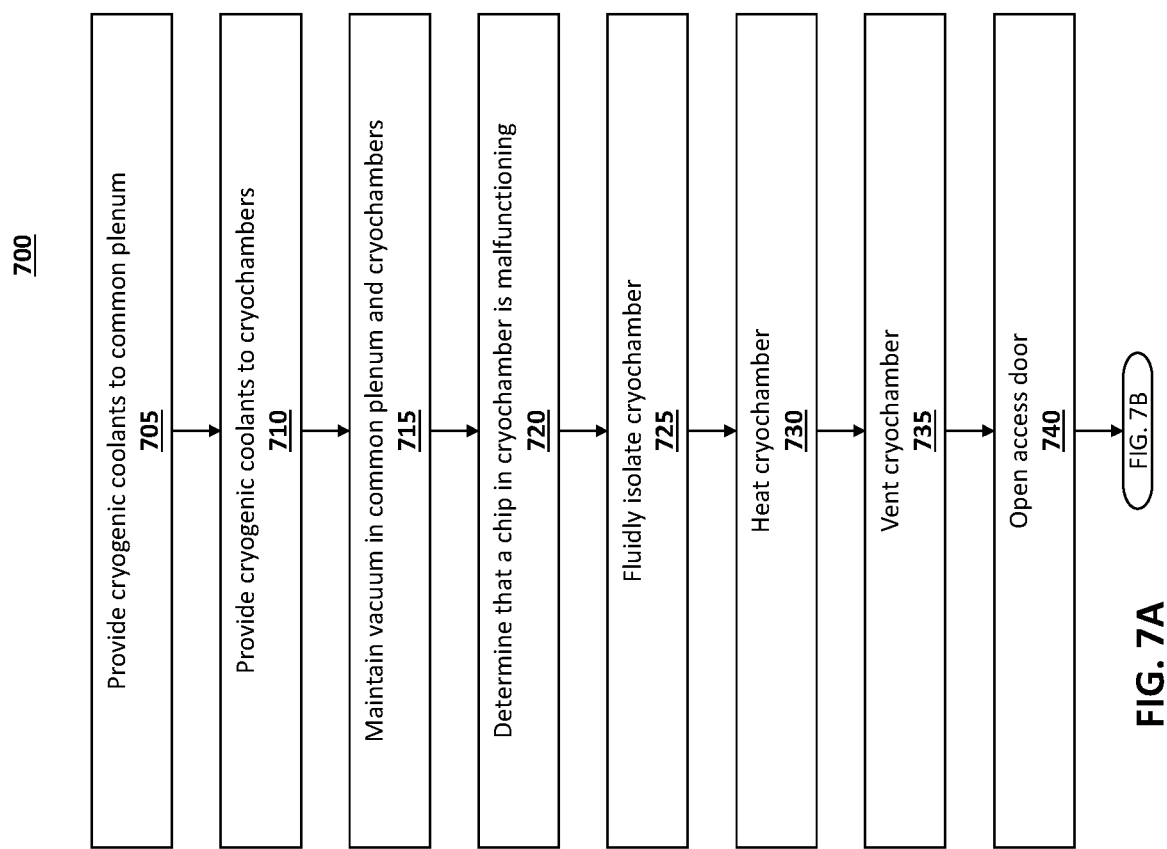
FIGS. 7A and 7B show a flow diagram of a method for implementing a modular distributed cryogenic system, in accordance with some example embodiments.
Figure 7B:
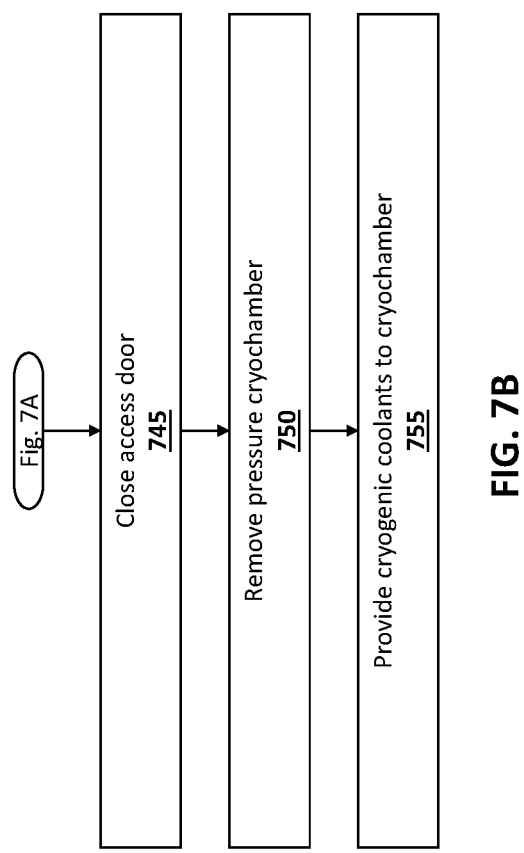

FIGS. 7A and 7B show a flowchart of an example method 700 for implementing a modular cryogenic system, in accordance with some example embodiments. As shown in FIG. 7A, the method 700 may include providing a plurality of different cryogenic coolants to a common chamber that may include cryogenic fluid conduits to circulate the plurality of different cryogenic coolants (block 705). For example, the hub 310 may provide a plurality of different cryogenic coolants to a common chamber 304 that may include cryogenic fluid conduits (e.g., pipes) to circulate the plurality of different cryogenic coolants (e.g., liquid helium, liquid nitrogen), as described above.

As also shown in FIG. 7A, the method 700 may include providing the plurality of different cryogenic coolants from the cryogenic fluid conduits to a plurality of cryochambers (e.g., cryochamber 302) that are connected to the common chamber 304. In some embodiments, cryochamber houses quantum chips, such as one or more cryogenic quantum information processing chips that are cooled to a cryogenic temperature by the plurality of different cryogenic coolants (block 710). As further shown in FIG. 7A, method 700 may include maintaining a vacuum in the common chamber and the plurality of cryochambers using a vacuum pump 353 that pumps the common chamber 304 and cryochambers with open vacuum valves (block 715). As also shown in FIG. 7A, the method 700 may include determining, using one or more processors (e.g., classical control 1007, terminal, desktop computer), a cryogenic quantum information processing chip in one of the cryochambers is malfunctioning (block 720). For example, classical control 1007 may receive an error flag from a control unit that monitors the operation of the malfunctioning chip. As further shown in FIG. 7A, method 700 may include actuating valves 306 to fluidly isolate the one of the cryochambers (block 725). As also shown in FIG. 7A, the method 700 may include activating heaters (e.g., heaters 610, heaters 612) inside the one of the cryochambers to raise a temperature of the one of the cryochambers (block 730). In some example embodiments, heating is optional and the after fluidly isolating the chamber, the chamber is vented.

As further shown in FIG. 7A, the method 700 may include venting the one of the cryochambers (e.g., via vent 517, FIG. 5B) such that the one of the cryochambers is set to ambient pressure (block 735). As also shown in FIG. 7A, method 700 may include opening an access door 502 to the one of the cryochambers to replace the cryogenic quantum information processing chip with a replacement cryogenic information processing chip (block 740).

With reference to FIG. 7B, the method 700 may include closing the access door 502 (block 745) to ready the chamber for cooling and vacuum pumping. As also shown in FIG. 7B, method 700 may include removing pressure from the one of the cryochambers using the vacuum pump that manages the vacuum in the common chamber (block 750). For example, device may remove pressure from the one of the cryochambers using the vacuum pump 353 that manages the vacuum in the common chamber, as described above.

As further shown in FIG. 7B, the method 700 may include actuating the valves 316 to provide the plurality of different cryogenic coolants to the one of the cryochambers to lower a temperature of the one of the cryochambers to the cryogenic temperature (block 755).

In some example embodiments, the same or similar processes of method 700 are implemented to shut down a ring of cryochambers or sets of loop cryochambers systems by opening and shutting hub valve or supply line valves, optionally heating, and venting the specific rings or pods, thereby allowing modularized access to a cryogenically cooled, electro-optical computation system in an efficient manner (e.g., without shutting down the cryoplant or the entire system). Although FIGS. 7A and 7B show example blocks of method 700, in some implementations, method 700 may include additional blocks, fewer blocks, different blocks, or differently arranged blocks than those depicted in FIGS. 7A and 7B. Additionally, or alternatively, two or more of the blocks of method 700 may be performed in parallel.

The following are example embodiments:

Example 1: A modular distributed cryogenic distribution system, comprising: a common chamber housing cryogenic fluid conduits; and a plurality of cryochambers connected to the common chamber.

Example 2: The modular distributed cryogenic distribution system of Example 1, wherein a first one of the plurality of cryochambers is raisable to room temperature while a second one of the plurality of cryochambers continues to operate at a cryogenic temperature.

Example 3: The modular distributed cryogenic distribution system of Example 1 or Example 2, further comprising valves configured to fluidly isolate each cryochamber from the cryogenic fluid conduits in the common chamber Example 4: The modular distributed cryogenic distribution system of any one of Examples 1-3, further comprising a vacuum pump which is configured to maintain the common chamber and the plurality of cryochambers at vacuum during operation.

Example 5: The modular distributed cryogenic distribution system of any one of Examples 1-4, wherein the common chamber comprises a loop, and the vacuum pump is located in a central hub chamber surrounded by the loop.

Example 6: The modular distributed cryogenic distribution system of any one of Examples 1-5, wherein the plurality of cryochambers are connected to the loop via respective bulkheads comprising feedthroughs.

Example 7: The modular distributed cryogenic distribution system of any one of Examples 1-6, wherein each of the plurality of cryochambers comprises a quantum computing chip.

Example 8: The modular distributed cryogenic distribution system of any one of Examples 1-7, wherein each of the plurality of cryochambers further comprises liquid helium chamber in thermal connection a quantum computing chip and fluidly connected to the cryogenic fluid conduits.

Example 9: The modular distributed cryogenic distribution system of any one of Examples 1-8, wherein each of the plurality of cryochambers further comprises: a vacuum plenum enclosing the liquid helium chamber and the quantum computing chip; and a liquid nitrogen chamber at least partially enclosing the vacuum plenum and fluidly connected to the cryogenic fluid conduits.

Example 10: A method comprising: providing a plurality of different cryogenic coolants to a common chamber that comprises cryogenic fluid conduits to circulate the plurality of different cryogenic coolants; providing the plurality of different cryogenic coolants from the cryogenic fluid conduits to a plurality of cryochambers that are connected to the common chamber, each cryochamber comprising a quantum computing chip that are cooled to a cryogenic temperature by the plurality of different cryogenic coolants; maintaining a vacuum in the common chamber and the plurality of cryochambers using a vacuum pump that pumps the common chamber; determining, using one or more processors, that a particular quantum computer chip in one of the cryochambers is malfunctioning; actuating valves to fluidly isolate the one of the cryochambers; venting, using a vent, the one of the cryochambers such that the one of the cryochambers is set to ambient pressure; opening an access door to the one of the cryochambers to replace the particular quantum computing chip with a replacement quantum computing chip; closing the access door; creating a vacuum in the one of the cryochambers using the vacuum pump that manages the vacuum in the common chamber; and actuating the valves to provide the plurality of different cryogenic coolants to the one of the cryochambers to lower a temperature of the one of the cryochambers to the cryogenic temperature.

Example 11: The method of Example 10, wherein each cryochamber comprises a bulkhead interface to the common chamber to couple pressure between the common chamber and each cryochamber, and to further transmit data between quantum computing chips in different cryochambers of the plurality of cryochambers.

Example 12: The method of Example 10 or Example 11, wherein the bulkhead interface of a cryochamber of the plurality of cryochambers comprises: a vacuum interface to control fluid coupling between the common chamber and the cryochamber; an optical signal interface to transmit optical signals between cryochambers. an electrical signal interface to transmit electrical signals between the cryochambers.

Example 13: The method of any one of Examples 10-12, wherein the electrical signal interface comprises radio frequency (RF) electrical connections and direct current (DC) electrical connections; wherein the vacuum interface comprises a vacuum feed through, and wherein the vacuum interface is operable to isolate the cryochamber from the common chamber.

Example 14: The method of any one of Examples 10-13, wherein the optical signal interface comprises a plurality of optical fiber couplers.

Example 15: The method of any one of Examples 10-14, wherein the common chamber comprises a plurality of electrical interconnects that electrically connect to electrical signal interfaces to connect different cryochambers of the plurality of cryochambers.

Example 16: The method of any one of Examples 10-15, wherein the electrical interconnects comprises electrical cables.

Example 17: The method of any one of Examples 10-16, wherein the common chamber comprises a plurality of optical interconnects that optically couple to optical signal interfaces to connect different cryochambers of the plurality of cryochambers.

Example 18: The method of any one of Examples 10-17, wherein the optical interconnects comprises optical fibers.

Example 19: The method of any one of Examples 10-18, wherein the plurality of optical interconnects transmit photonic qubits between different cryochambers.

Example 20: The method of any one of Examples 10-19, further comprising: activating heaters inside the one of the cryochambers to raise a temperature of the one of the cryochambers, wherein the heaters are activated after the valves are actuated to fluidly isolate the one of the cryochambers from the different cryogenic coolants.

Example 21: The method of any one of Examples 10-20, wherein creating a vacuum in the one of the cryochambers comprises: individually pumping, using rough pump, the one of the cryochambers after the access door is closed to place the one of the cryochambers at a pressure that is nearer to a pressure of the common chamber.

Example 22: The method of any one of Examples 10-21, wherein creating a vacuum in the one of the cryochambers comprises: opening a vacuum valve to fluidly couple the one of the cryochambers to the common chamber; and pumping, using the vacuum pump of the common chamber, the common chamber and each cryochamber that is fluidly coupled to the common chamber.

Example 23: The method of any one of Examples 10-22, wherein the plurality of different cryogenic coolants are provided from a cryoplant.

Example 24: The method of any one of Examples 10-23, wherein a cryogenic loop system comprises the common chamber and the plurality of cryochambers, wherein the cryogenic loop system further comprises a hub that includes the vacuum pump, wherein the hub is connected through a pressure bulkhead to manage pressure for the common chamber and the plurality of cryochambers.

Example 25: The method of any one of Examples 10-24, wherein the hub further comprises a plurality of coolant storage tanks to receive and store the plurality of different cryogenic coolants from the cryoplant, the plurality of coolant storage tanks further connected to the cryogenic fluid conduits to provide the plurality of different cryogenic coolants to the plurality of cryochambers, wherein the hub further comprises one or more hub valves to fluidly isolate the cryogenic loop system from the cryoplant for maintenance of the cryogenic loop system without shutting down the cryoplant.

Example 26: The method of any one of Examples 10-25, the cryoplant comprises a plurality of cryogenic supply lines, each cryogenic supply line providing the plurality of different cryogenic coolants to a set of cryogenic loop systems, wherein each cryogenic supply line comprises one or more supply line valves to fluidly isolate the set of cryogenic loop systems.

Example 27: The method of any one of Examples 10-26, further comprising: actuating the one or more supply line valves to fluidly isolate the set of cryogenic loop systems; raising a temperature of cryochambers in the set of cryogenic loop systems using heaters in the cryochambers; venting the cryochambers using vents of respective cryochambers; and opening one or more access doors of the cryochambers.

Example 28: The method of any one of Examples 10-27, wherein the cryoplant is not shut down while the replacement quantum computing chip is installed in the one of the cryochambers.

Example 29: The method of any one of Examples 10-28, wherein the plurality of different cryogenic coolants comprises: liquid nitrogen and liquid helium.

Example 30: The method of any one of Examples 10-29, wherein cryochamber comprises: a liquid helium chamber in thermal connection the quantum computing chip, and wherein the liquid helium chamber is fluidly connected to the cryogenic fluid conduits to circulate liquid helium in the liquid helium chamber; and wherein cryochamber further comprises: a vacuum plenum that encloses the liquid helium chamber and the one or more cryogenic quantum information processing chips; and a liquid nitrogen chamber at least partially enclosing the vacuum plenum and fluidly connected to the cryogenic fluid conduits to circulate liquid nitrogen in the liquid nitrogen chamber.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A modular distributed cryogenic distribution system, comprising:
   a common chamber housing cryogenic fluid conduits;
   a plurality of cryochambers connected to the common chamber; and
   valves configured to fluidly isolate each cryochamber from the cryogenic fluid conduits in the common chamber,
   wherein a first one of the plurality of cryochambers is raisable to room temperature while a second one of the plurality of cryochambers continues to operate at a cryogenic temperature.

2. A modular distributed cryogenic distribution system, comprising:
   a common chamber housing cryogenic fluid conduits;
   a plurality of cryochambers connected to the common chamber; and
   a vacuum pump which is configured to maintain the common chamber and the plurality of cryochambers at vacuum during operation.

3. The modular distributed cryogenic distribution system of claim 2, wherein the common chamber comprises a loop, and the vacuum pump is located in a central hub chamber surrounded by the loop.

4. The modular distributed cryogenic distribution system of claim 3, wherein the plurality of cryochambers are connected to the loop via respective bulkheads comprising feedthroughs.

5. A modular distributed cryogenic distribution system, comprising:
   a common chamber housing cryogenic fluid conduits; and
   a plurality of cryochambers connected to the common chamber, wherein each of the plurality of cryochambers comprises a quantum computing chip.

6. A modular distributed cryogenic distribution system, comprising:
   a common chamber housing cryogenic fluid conduits; and
   a plurality of cryochambers connected to the common chamber, wherein each of the plurality of cryochambers further comprises a liquid helium chamber in thermal connection with a quantum computing chip and fluidly connected to the cryogenic fluid conduits.

7. The modular distributed cryogenic distribution system of claim 6, wherein each of the plurality of cryochambers further comprises:
   a vacuum plenum enclosing the liquid helium chamber and the quantum computing chip; and
   a liquid nitrogen chamber at least partially enclosing the vacuum plenum and fluidly connected to the cryogenic fluid conduits.

8. A method comprising:
   providing a plurality of different cryogenic coolants to a common chamber that comprises cryogenic fluid conduits to circulate the plurality of different cryogenic coolants;
   providing the plurality of different cryogenic coolants from the cryogenic fluid conduits to a plurality of cryochambers that are connected to the common chamber, each cryochamber comprising a quantum computing chip that are cooled to a cryogenic temperature by the plurality of different cryogenic coolants;

maintaining a vacuum in the common chamber and the plurality of cryochambers using a vacuum pump that pumps the common chamber;

determining, using one or more processors, that a particular quantum computer chip in one of the cryochambers is malfunctioning;

actuating valves to fluidly isolate the one of the cryochambers;

venting, using a vent, the one of the cryochambers such that the one of the cryochambers is set to ambient pressure;

opening an access door to the one of the cryochambers to replace the particular quantum computing chip with a replacement quantum computing chip;

closing the access door;

creating a vacuum in the one of the cryochambers using the vacuum pump that manages the vacuum in the common chamber; and actuating the valves to provide the plurality of different cryogenic coolants to the one of the cryochambers to lower a temperature of the one of the cryochambers to the cryogenic temperature.

9. The method of claim 8, wherein each cryochamber comprises a bulkhead interface to the common chamber to couple pressure between the common chamber and each cryochamber, and to further transmit data between quantum computing chips in different cryochambers of the plurality of cryochambers.

10. The method of claim 9, wherein the bulkhead interface of a cryochamber of the plurality of cryochambers comprises: a vacuum interface to control fluid coupling between the common chamber and the cryochamber, an optical signal interface to transmit optical signals between cryochambers, and an electrical signal interface to transmit electrical signals between the cryochambers.

11. The method of claim 10, wherein the electrical signal interface comprises radio frequency (RF) electrical connections and direct current (DC) electrical connections; wherein the vacuum interface comprises a vacuum feed through, and wherein the vacuum interface is operable to isolate the cryochamber from the common chamber.

12. The method of claim 10, wherein the optical signal interface comprises a plurality of optical fiber couplers.

13. The method of claim 8, wherein the common chamber comprises a plurality of optical interconnects that optically couple to optical signal interfaces to connect different cryochambers of the plurality of cryochambers.

14. The method of claim 10, wherein the common chamber comprises a plurality of electrical interconnects that electrically connect to electrical signal interfaces to connect different cryochambers of the plurality of cryochambers.

15. The method of claim 13, wherein the optical interconnects comprises optical fibers.

16. The method of claim 14, wherein the electrical interconnects comprises electrical cables.

17. The method of claim 13, wherein the plurality of optical interconnects transmit photonic qubits between different cryochambers.

18. The method of claim 8, further comprising:
activating heaters inside the one of the cryochambers to raise a temperature of the one of the cryochambers, wherein the heaters are activated after the valves are actuated to fluidly isolate the one of the cryochambers from the different cryogenic coolants.

19. The method of claim 8, wherein creating a vacuum in the one of the cryochambers comprises:
individually pumping, using a rough pump, the one of the cryochambers after the access door is closed to place the one of the cryochambers at a pressure that is nearer to a pressure of the common chamber.

20. The method of claim 19, wherein creating a vacuum in the one of the cryochambers comprises:
opening a vacuum valve to fluidly couple the one of the cryochambers to the common chamber; and
pumping, using the vacuum pump of the common chamber, the common chamber and each cryochamber that is fluidly coupled to the common chamber.

21. The method of claim 8, wherein the plurality of different cryogenic coolants are provided from a cryoplant.

22. The method of claim 21, wherein a cryogenic loop system comprises the common chamber and the plurality of cryochambers, wherein the cryogenic loop system further comprises a hub that includes the vacuum pump, wherein the hub is connected through a pressure bulkhead to manage pressure for the common chamber and the plurality of cryochambers.

23. The method of claim 22, wherein the hub further comprises a plurality of coolant storage tanks to receive and store the plurality of different cryogenic coolants from the cryoplant, the plurality of coolant storage tanks further connected to the cryogenic fluid conduits to provide the plurality of different cryogenic coolants to the plurality of cryochambers, wherein the hub further comprises one or more hub valves to fluidly isolate the cryogenic loop system from the cryoplant for maintenance of the cryogenic loop system without shutting down the cryoplant.

24. The method of claim 23, the cryoplant comprises a plurality of cryogenic supply lines, each cryogenic supply line providing the plurality of different cryogenic coolants to a set of cryogenic loop systems, wherein each cryogenic supply line comprises one or more supply line valves to fluidly isolate the set of cryogenic loop systems.

25. The method of claim 24, further comprising:
actuating the one or more supply line valves to fluidly isolate the set of cryogenic loop systems;
raising a temperature of cryochambers in the set of cryogenic loop systems using heaters in the cryochambers;
venting the cryochambers using vents of respective cryochambers; and
opening one or more access doors of the cryochambers.

26. The method of claim 21, wherein the cryoplant is not shut down while the replacement quantum computing chip is installed in the one of the cryochambers.

27. The method of claim 8, wherein the plurality of different cryogenic coolants comprises: liquid nitrogen and liquid helium.

28. The method of claim 8, wherein cryochamber comprises: a liquid helium chamber in thermal connection with the quantum computing chip, and wherein the liquid helium chamber is fluidly connected to the cryogenic fluid conduits to circulate liquid helium in the liquid helium chamber; and
wherein cryochamber further comprises a vacuum plenum that encloses the liquid helium chamber and one or more quantum computing chips, and a liquid nitrogen chamber at least partially enclosing the vacuum plenum and fluidly connected to the cryogenic fluid conduits to circulate liquid nitrogen in the liquid nitrogen chamber.

\* \* \* \* \*